United States Patent
Amemiya

(10) Patent No.: US 10,412,255 B2
(45) Date of Patent: Sep. 10, 2019

(54) LIGHTING APPARATUS AND APPARATUS FOR READING IMAGES

(71) Applicant: Fumimasa Amemiya, Yamanashi-ken (JP)

(72) Inventor: Fumimasa Amemiya, Yamanashi-ken (JP)

(73) Assignee: CANON FINETECH NISCA INC., Misato-Shi, Saitama (JP)

( * ) Notice: Subject to any disclaimer, the term of this patent is extended or adjusted under 35 U.S.C. 154(b) by 103 days.

(21) Appl. No.: 15/688,140

(22) Filed: Aug. 28, 2017

(65) Prior Publication Data
US 2018/0063354 A1    Mar. 1, 2018

(30) Foreign Application Priority Data

Aug. 30, 2016   (JP) .................................. 2016-167609
Aug. 30, 2016   (JP) .................................. 2016-167610

(51) Int. Cl.
| H04N 1/04 | (2006.01) |
| H04N 1/028 | (2006.01) |
| F21V 8/00 | (2006.01) |
| H05B 33/08 | (2006.01) |

(52) U.S. Cl.
CPC ....... H04N 1/02835 (2013.01); G02B 6/0031 (2013.01); H04N 1/0289 (2013.01); *H04N 2201/0081* (2013.01); *H05B 33/0845* (2013.01)

(58) Field of Classification Search
CPC ............. H04N 1/02835; H04N 1/0289; H04N 2201/0081; H04N 33/0845; G02B 6/0031

USPC .......................................... 358/484, 475, 509
See application file for complete search history.

(56) References Cited

U.S. PATENT DOCUMENTS

| 6,127,675 A * | 10/2000 | Nakamura ......... H04N 1/02815 |
| | | 250/227.26 |
| 2009/0010020 A1 * | 1/2009 | Katsumata ............. G03B 27/54 |
| | | 362/554 |
| 2011/0044059 A1 * | 2/2011 | Inoue .................... G02B 6/0001 |
| | | 362/311.07 |

(Continued)

FOREIGN PATENT DOCUMENTS

| JP | 2002-125098 A | 4/2002 |
| JP | 2008-140726 A | 6/2008 |

(Continued)

*Primary Examiner* — Cheukfan Lee
(74) *Attorney, Agent, or Firm* — Manabu Kanesaka

(57) ABSTRACT

To suppress unevenness in intensity distribution of output light in a longitudinal direction of a light guide body, a lighting apparatus includes a rod-shaped light guide body, and light source units provided in end faces of the body, where the light guide body includes first and second reflecting surfaces that perform diffuse reflection on light input from the light source, and a light output surface that outputs reflected light from both of the reflecting surfaces to the outside. The first reflecting surface includes a first diffuse reflection pattern having discontinuous pattern portions provided near the end faces in the longitudinal direction of the light guide body and a continuous pattern portion in the center portion, and the second reflecting surface includes a second diffuse reflection pattern to reduce a ripple in the longitudinal direction of a quantity of the light reflected from the first diffuse reflection pattern and output.

20 Claims, 12 Drawing Sheets

(56) References Cited

U.S. PATENT DOCUMENTS

| | | | | |
|---|---|---|---|---|
| 2011/0102862 A1* | 5/2011 | Inoue | ............... | H04N 1/02815 |
| | | | | 358/474 |
| 2011/0299138 A1* | 12/2011 | Minamikawa | ..... | H04N 1/02815 |
| | | | | 358/474 |
| 2014/0029256 A1* | 1/2014 | Tanaka | ................. | G02B 6/0001 |
| | | | | 362/235 |
| 2014/0355291 A1* | 12/2014 | Okamoto | ............ | G02B 6/0096 |
| | | | | 362/551 |

FOREIGN PATENT DOCUMENTS

| | | |
|---|---|---|
| JP | 2010-205565 A | 9/2010 |
| JP | 2011-044336 A | 3/2011 |
| JP | 2014-103629 A | 6/2014 |

* cited by examiner

LIGHT INTENSITY DISTRIBUTION IN
SUB-SCANNING DIRECTION

LIGHT INTENSITY DISTRIBUTION IN
SUB-SCANNING DIRECTION

LIGHTING APPARATUS AND APPARATUS FOR READING IMAGES

BACKGROUND OF THE INVENTION

Field of the Invention

The present invention relates to a lighting apparatus used in an image reading apparatus, for example, such as a facsimile, copier and image scanner and other various optical devices, and an image reading apparatus provided with the lighting apparatus.

Description of the Related Art

Conventionally, in an image reading apparatus such as a facsimile, copier and image scanner, in order to read an image of an original document with a line image sensor, a lighting apparatus has been widely used which applies linear light in a main scanning direction (arrangement direction of the line image sensor). Each of many lighting apparatuses is provided with a rod-shaped light guide body and a light source disposed near an end face of the body, where for a period during which light incident from the end face of the light guide body propagates toward an end portion on the opposite side, while repeating total reflection inside the light guide body, the light undergoes diffuse reflection by a reflecting surface in the longitudinal direction, and the apparatus outputs linear light toward an original document surface from a light output surface opposed thereto.

Generally, in such a lighting apparatus, uniformity is required in illuminance distribution along the main scanning direction in a read surface of the original document. Therefore, a line lighting apparatus is known where light scattering patterns by printing of a white coating are formed on the surface in the longitudinal direction of the light guide body so that the pattern is continuous in a middle portion in the longitudinal direction, while being discontinuous near end portions, and a light quantity is thereby suppressed near the end portions of the light guide body to uniform the intensity of output light in the longitudinal direction of the light guide body (see Japanese Patent Application Publication No. 2002-125098).

Further, another lighting apparatus is known where in the light output surface of the light guide body, a concavo-convex portion for light diffusion is provided near the end portion close to the light source in the longitudinal direction so as to diffuse the output light in a line width direction orthogonal to the longitudinal direction (see Japanese Patent Application Publication No. 2008-140726). By this means, it is made possible to resolve an irradiation peak near the light source by the output light, and to obtain an appropriate uniform illuminance distribution in the longitudinal direction.

Similarly, in the lighting apparatus of the image reading apparatus, in order to uniformize brightness and illuminance of output light in the longitudinal direction of the light guide body, a light source module is proposed where a light diffusion structure is provided on each of a light extraction surface for outputting light from the light guide body and a first light diffusion surface opposed thereto (see Japanese Patent Application Publication No. 2010-205565). In the first light diffusion structure of the first light diffusion surface, a plurality of diffusion portions is disposed so that the density increases as the portion is farther from the end portion of the light guide body, the intensity distribution of output light is thereby uniformized, the first structure is combined with the second light diffusion structure on the light extraction surface, which forms a rectangle with a certain width in the longitudinal direction, and it is made easy to control brightness and illuminance of the output light.

Further, in the Japanese Patent Application Publication No. 2010-205565 is described a light source module of Embodiment 2 where the diffusion portion of the first light diffusion structure is disposed at regular intervals in the longitudinal direction, and the width of the second light diffusion structure is widened toward the center from the end portion of the light guide body. The brightness and illuminance distributions of the output light are controlled similarly to be uniform by the pattern shape of the second light diffusion structure.

In the conventional lighting apparatus as described in the above-mentioned Japanese Patent Application Publication No. 2002-125098, there is the risk that uneven illuminance occurs on the original document read surface along the longitudinal direction due to the discontinuous light scattering pattern of the light guide body. There is a problem that the uneven illuminance generates inconsistencies in density in the read image of the original document, and degrades the image quality.

In the lighting apparatus as described in the Japanese Patent Application Publication No. 2008-140726, a quantity of light applied from the light output surface to the original document surface abruptly changes at the boundary of the concavo-convex portion for light diffusion along the longitudinal direction of the light guide body, and there is the risk that a change in the density occurs in the read image of the original document. Further, near the end portion of the light guide body with the light source provided, there is a problem that a considerable quantity of output light scatters outside a reading region in a sub-scanning direction (direction orthogonal to the main scanning direction) of the original document surface due to the concavo-convex portion for light diffusion.

In the light source module as described in the Japanese Patent Application Publication No. 2010-205565, over the entire longitudinal direction of the light extraction surface, a considerable quantity of output light scatters outside the reading region in the sub-scanning direction of the original document surface due to the second light diffusion structure. Therefore, the problem arises that illuminance decreases over the entire original document reading region.

Particularly, in the optical module of Embodiment 2 in the Japanese Patent Application Publication No. 2010-205565, the width of the second light diffusion structure is formed to be narrower from the center portion of the light guide body toward the opposite end portions. In the portion where the width of the second light diffusion structure is narrow, the effect of manufacturing tolerance develops larger than in the portion with the wide width. As a result, variations tend to occur in the illuminance distribution in each light guide body and/or between light guide bodies.

On the other hand, also in each of conversion elements constituting the image sensor which receives reflected light from the original document read surface to perform photo-electric conversion, variations occur in received light sensitivity and conversion efficiency due to manufacturing. In order to concurrently correct such variations in sensitivity and the like in the image sensor and unevenness in illuminance in the lighting apparatus, shading correction has conventionally been performed, generally, using a white reference plate. Specifically, image reading is performed, while bringing the white reference plate with uniform high reflectance into intimate contact with a platen glass surface, a correction amount is calculated based on output of each conversion element of the image sensor, and using the correction amount, output of each conversion element is corrected in actual original document reading.

In addition, when a fold, wrinkle, warpage and the like exist in an original document, the read surface of the original document sometimes rises from the platen glass. Further, the original document automatically transported with the so-called automatic document feeder (ADF) sometimes rises from the platen glass and passes through a separate position. Unevenness in light intensity distribution of the light output from the light guide body varies according to a height from the platen glass, and therefore, in the read image of the original document rising from the platen glass, there is the risk that it is not possible to resolve inconsistencies in density and reduction in image quality, even using the correction amount on the platen glass surface.

SUMMARY OF THE INVENTION

The present invention was made in view of above-mentioned problems in conventional techniques, and in a lighting apparatus for outputting linear light using a rod-shaped light guide body with a light source provided in an end portion, it is an object of the invention to reduce a light quantity particularly output from vicinities of the end portion of the light guide body provided with the light source along the longitudinal direction of the light guide body, suppress unevenness in light intensity distribution, and to enhance uniformity of illuminance distribution.

Further, in an image reading apparatus for performing photoelectric conversion on reflected light of the light applied to a read surface of an original document and forming a read image, it is another object of the invention to enhance uniformity in light intensity distribution in the main scanning direction of the original document read surface so as to enable a read image of high quality without inconsistencies in density to be obtained, even when the original document read surface rises from platen glass.

A lighting apparatus is comprised of a rod-shaped light guide body formed of a translucent material, and a light source to input light to the light guide body from at least one end face in a longitudinal direction of the body, where the light guide body includes a plurality of reflecting surfaces that reflect the light input to the light guide body from the light source, and a light output surface that outputs the light from the light guide body to the outside, at least one of the reflecting surfaces includes a first diffuse reflection pattern for performing diffuse reflection on the light including a discontinuous pattern formed intermittently at predetermined intervals along the longitudinal direction, and at least one of the other reflecting surfaces includes a second diffuse reflection pattern for performing diffuse reflection on the light provided to reduce a variation in the longitudinal direction of a quantity of the light that is reflected from the first diffuse reflection pattern and that is output from the light output surface.

A lighting apparatus is comprised of a rod-shaped light guide body formed of a translucent material, and a light source to input light to the light guide body from at least one end face in a longitudinal direction of the body, where the light guide body includes a plurality of reflecting surfaces that reflect the light input to the light guide body from the light source, and a light output surface that outputs the light from the light guide body to the outside, at least one of the reflecting surfaces includes a first diffuse reflection pattern for performing diffuse reflection on the light including a discontinuous pattern formed intermittently at predetermined intervals along the longitudinal direction, and at least one of the other reflecting surfaces includes a second diffuse reflection pattern for performing diffuse reflection on the light provided to correspond to the predetermined intervals of the discontinuous pattern along the longitudinal direction.

According to the lighting apparatus of the present invention, it is possible to improve uniformity of illuminance distribution in the original document surface targeted for reading, by combining at least one of reflecting surfaces that includes the first diffuse reflection pattern for performing diffuse reflection on the light including the discontinuous pattern formed intermittently at predetermined intervals along the longitudinal direction of the light guide body with at least one of the other reflecting surfaces that includes the second diffuse reflection pattern provided to reduce unevenness i.e. variations, in the longitudinal direction of the light guide body, in the quantity of the light that is reflected from the first diffuse reflection pattern and that is output from the light output surface.

DESCRIPTION OF THE EMBODIMENTS

Figure 1:
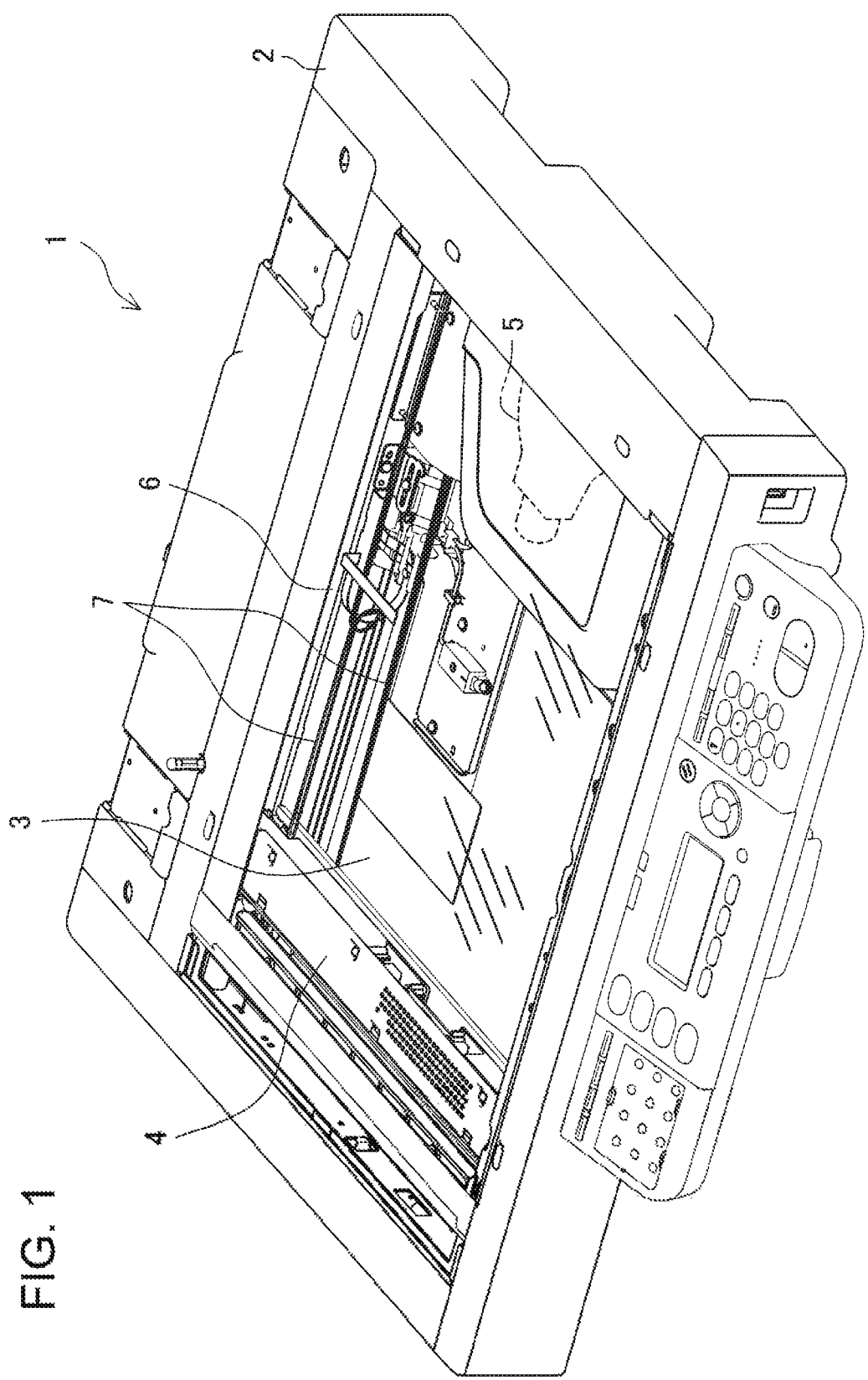
FIG. 1 is a schematic perspective view illustrating an entire configuration of an image reading apparatus according to the present invention.

Preferred Embodiments of the present invention will be described below in detail with reference to accompanying drawings. In addition, in the accompanying drawings, similar components through the entire present Description are assigned the same reference numerals to represent.

FIG. 1 schematically illustrates an entire configuration of an image reading apparatus provided with a lighting apparatus of the preferred Embodiment according to the present invention. The image reading apparatus 1 of this Embodiment is a flatbed type image scanner constituting an image reading means as a part of an image formation apparatus. In an upper portion of the image reading apparatus 1, it is possible to install a platen cover or auto document feeder (ADF) not shown to be openable and closable via a hinge mechanism.

The image reading apparatus 1 has a low-profile apparatus housing 2 substantially in the shape of a rectangular box, and to its top face is fixed platen glass 3 made of a large rectangular transparent glass plate. A reading-target original document is placed on the top face of the platen glass 3 with the read surface laid downward, and by closing the platen cover, is brought into intimate contact with the top face of the platen glass. Alternatively, by the ADF, an original document is transported in a state in which the document is brought into contact with the top face of the platen glass 3 or slightly rises from the top face of the platen glass above the platen glass 3.

Inside the apparatus housing 2 is installed an image reading mechanism of optical reduction system comprised of a reading carriage 4 and reading section 5. As described later, the reading carriage 4 is provided with a lighting apparatus of the present invention for applying linear light to the original document read surface. In this Embodiment, the lighting apparatus is arranged to apply linear light in a main scanning direction (reading width direction) of the original document i.e. along the front-rear direction shown in FIG. 1. In the image reading mechanism of this Embodiment, the reading carriage 4 and reading section 5 are configured separately, and in another Embodiment, may be configured integrally.

Inside the apparatus housing 2, a pair of guide rails 6 extending linearly along the front and rear opposite side portions is provided over substantially the entire right-left width. The reading carriage 4 is disposed immediately below the platen glass 3, and its front and rear opposite end portions are supported by the guide rails 6 to be able to run in the right-left direction i.e. in a direction (sub-scanning direction) orthogonal to the main scanning direction.

In reading an original document placed on the platen glass 3, the reading carriage 4 is driven by a drive motor (not shown) via wires 7 and the like, and shifts in parallel with the platen glass 3 along the guide rails 6 in a reading direction of the original document i.e. in the sub-scanning direction. In reading the original document transported on the platen glass 3 by the ADF, the reading carriage 4 is held in a state in which the carriage 4 is halted in a reference position shown in FIG. 1 i.e. in one end position in the sub-scanning direction.

The reading section 5 is provided with an image-formation optical system 8 comprised of a condenser lens and the like, and a line sensor (not shown) comprised of a lot of light receiving elements that are CCDs, C-MOSs or the like. The reading section 5 is disposed in an end position in the sub-scanning direction on the side opposite to the reference position of the reading carriage, with the condenser lens of the image-formation optical system 8 faced toward the reading carriage 4 side. Reflected light from the original document read surface irradiated by the lighting apparatus undergoes image formation by the image-formation optical system 8, and is converted into image data by the line sensor.

Figure 2:
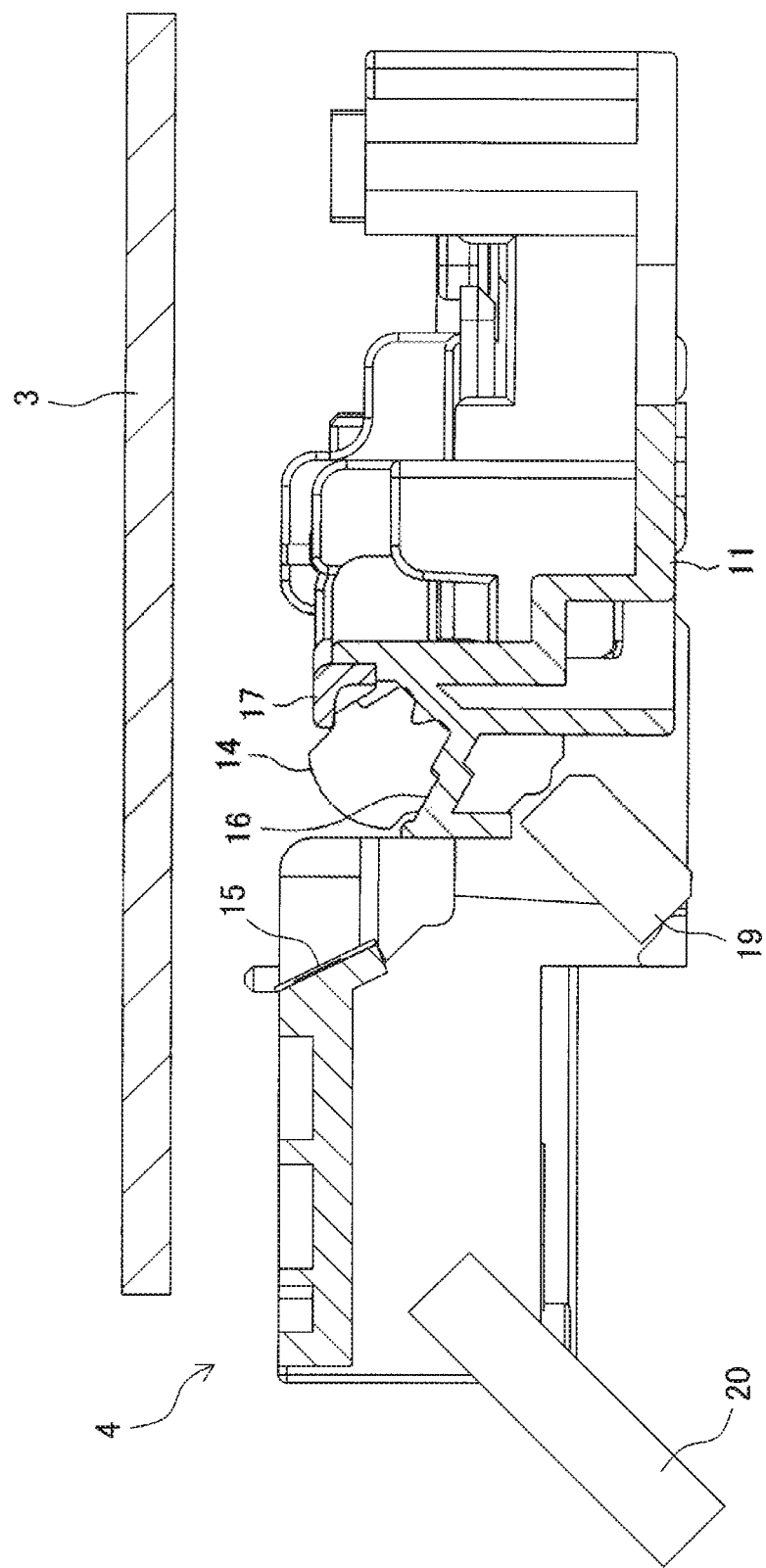
FIG. 2 is a plan view of a reading carriage provided with a lighting apparatus according to the invention.
Figure 3:
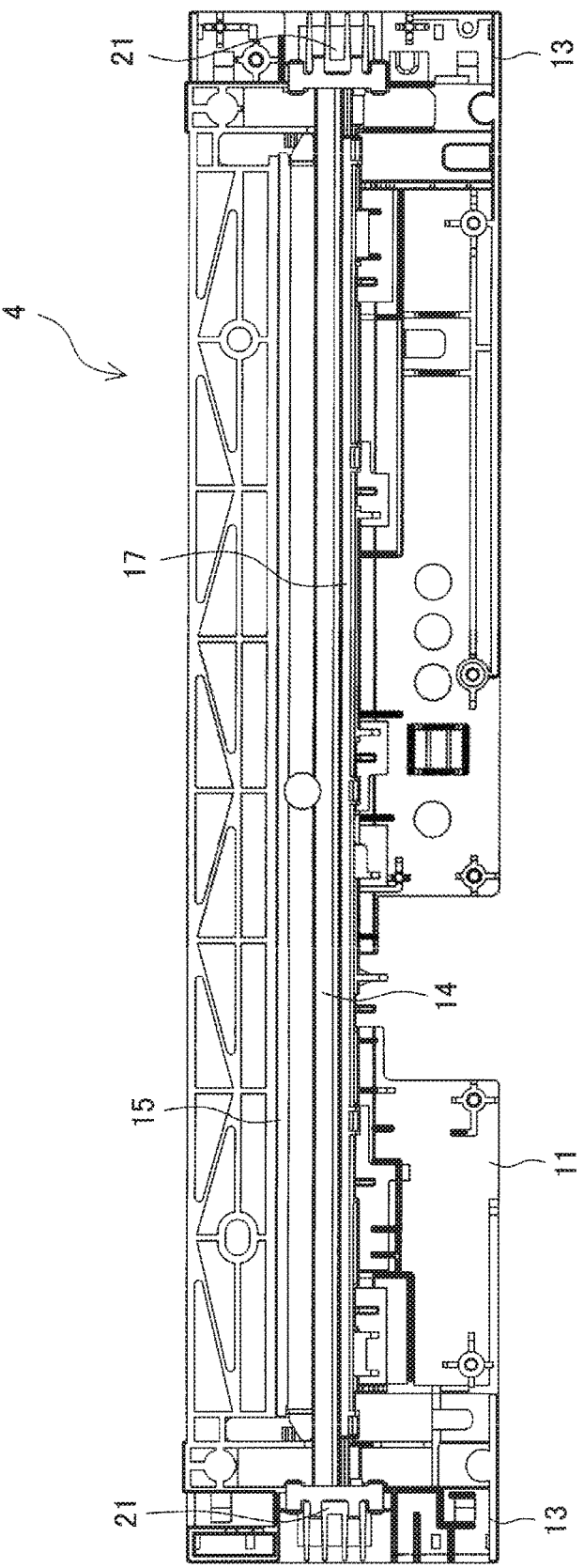
FIG. 3 is an enlarged cross-sectional view of the reading carriage of FIG. 2.

FIGS. 2 and 3 schematically illustrate a configuration of the reading carriage 4 of this Embodiment. The reading carriage 4 has a carriage section 11 extending in the main scanning direction between the guide rails 6, and a lighting apparatus 12 integrally incorporated into the carriage section. The carriage section 11 has attachment portions 13, on opposite ends in the longitudinal direction (main scanning direction), attached to respective adjacent guide rails 6 to be able to shift. The carriage section 11 is formed integrally, for example, using a metal material and/or hard synthetic resin material.

The lighting apparatus 12 has a light source section, a lighting optical system for irradiating the original document read surface with light of the light source, and a reflection optical system for guiding reflected light from the original document read surface to the reading section 5. The lighting optical system is comprised of a rod-shaped light guide body 14 for converting the light from the light source into linear light to output, and a reflector 15 for reflecting a part of output light of the light guide body toward the original document read surface.

In the carriage section 11 is formed a groove portion 16 along the longitudinal direction of the light guide body to accommodate the light guide body 14. The light guide body 14 disposed inside the groove portion 16 is clamped from above by a fix member 17, and is held in predetermined position and direction in the carriage section 11. The fix member 17 is installed detachably, by engaging elastic deformation-capable hook portions 18 in a catch portion of the carriage section 11. The reflector 15 is fixed to the carriage section 11 in parallel with the light guide body in the main scanning direction, with its reflecting surface faced toward the light guide body 14.

The reflection optical system is comprised of a plurality of reflecting mirrors for guiding the reflected light from the original document read surface toward the condenser lens of the reading section 5. In the plurality of reflecting mirrors, in order to obtain an optical length with a predetermined length from the original document read surface to the condenser lens, the number and arrangement of mirrors are set. To simplify the drawing, FIG. 2 illustratively describes a first reflecting mirror 19 that directly reflects the reflected light from the original document read surface, and a second reflecting mirror 20 that reflects reflected light from the first reflecting mirror.

Figure 4:
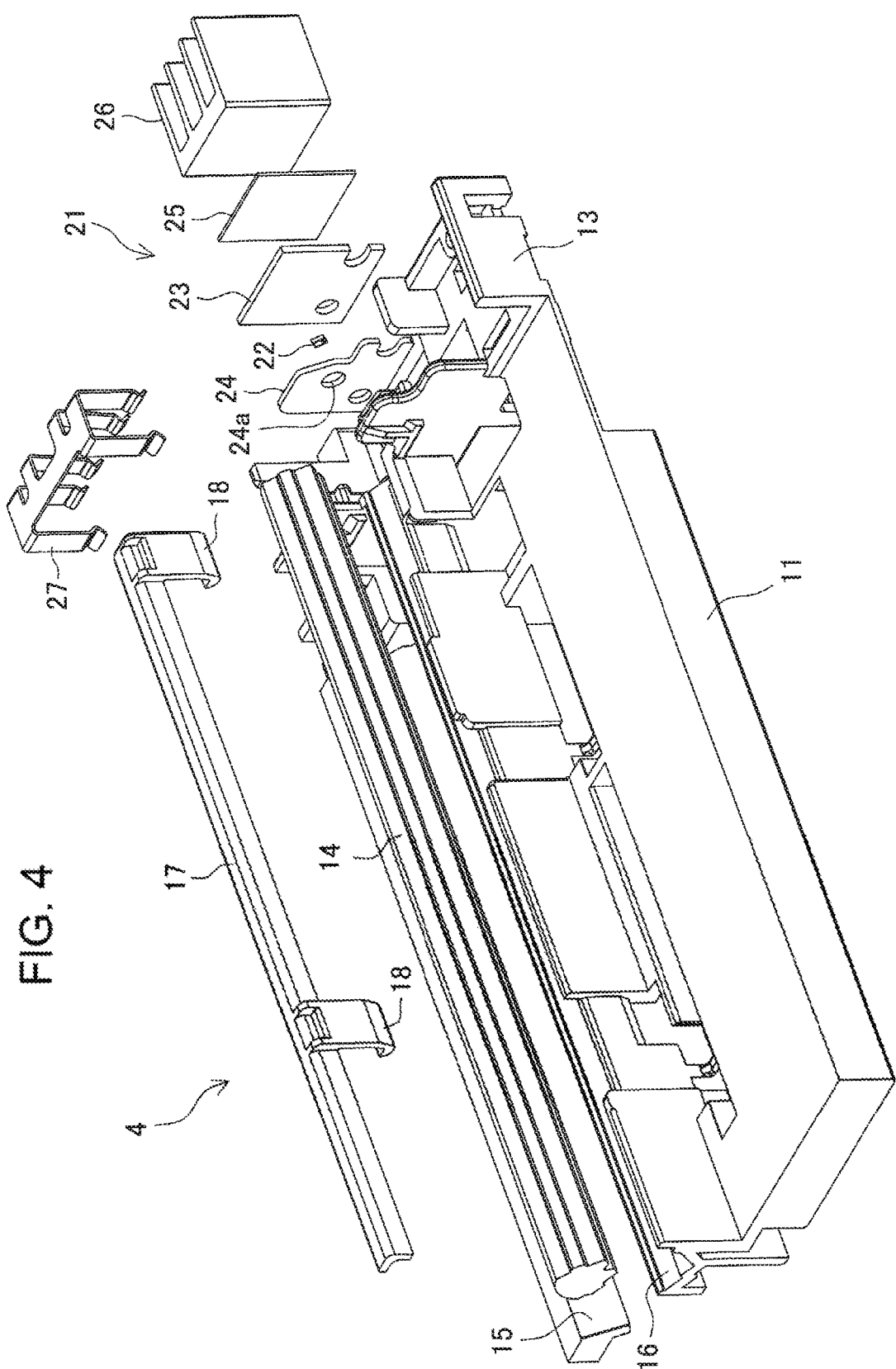
FIG. 4 is an exploded perspective view illustrating a part of the reading carriage of FIG. 2.

The light source section has two light source units 21 disposed near the opposite ends in the longitudinal direction of the light guide body 14 installed in the carriage section 11 as described above. As shown in FIG. 4, each of the light source units 21 has a luminous element 22 that is a light source, a circuit board 23 mounted with the luminous element, and a reflector member 24 layered on the front surface of the circuit board mounted with the luminous element 22. For example, the luminous element 22 is a light emitting device made of a white LED chip. In the reflector member 24, a circular hole 24a penetrates so that the luminous element 22 is disposed inside the hole. On the rear of the circuit board 23 is provided a heat sink 26 via a heat transfer sheet 25.

As shown in FIG. 4, the light source unit 21 is installed in the carriage section 11 detachably by a clip 27 made of a plate spring in the shape of a C viewed from the side. Each light source unit 21 is disposed so that the reflector member 24 is brought into contact with the adjacent end face of the light guide body 14. By interposing the reflector member 24 between the circuit board 23 and the end face of the light guide body 14, it is possible to define a clearance of a predetermined size between the end face of the light guide body 14 and the luminous element 22. By this means, it is possible to input light of the luminous element 22 from the end face of the light guide body 14, without leaking to the outside. Further, in the case where the inner surface of the circular hole 24a of the reflector member 24 is formed in high reflectance by vapor-depositing a metal thin film, for example, such as aluminium and silver, the light of the luminous element 22 is not lost substantially, and such a case is suitable.

In another Embodiment, it is possible to arrange a plurality of luminous elements in each light source unit 21. As the luminous element 22, as well as the LED, it is possible to adopt various publicly known luminous elements such as organic or inorganic EL (electric luminescence) and LD (laser diode). Further, in the case of using the white LED in the luminous element 22 as in this Embodiment, the line sensor of the reading section 5 outputs only a monochrome image. In the case of intending to output a color image, red, green and blue LEDs are used corresponding to three primary colors RGB. Instead of the three-color LEDs, it is also possible to read a color image, by combining a white LED, and red, green and blue optical color filters. Further, a three-line line sensor provided with respective color filters of RGB may be used.

Figure 5:
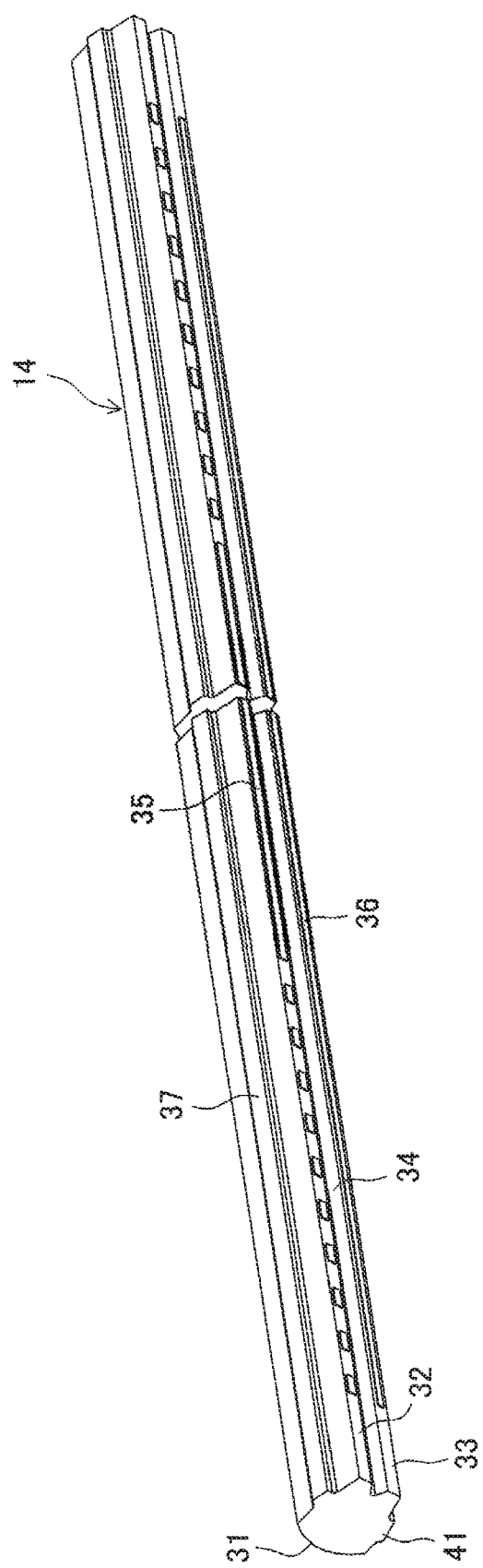
FIG. 5 is a perspective view of a light guide body of FIG. 2.
Figure 6:
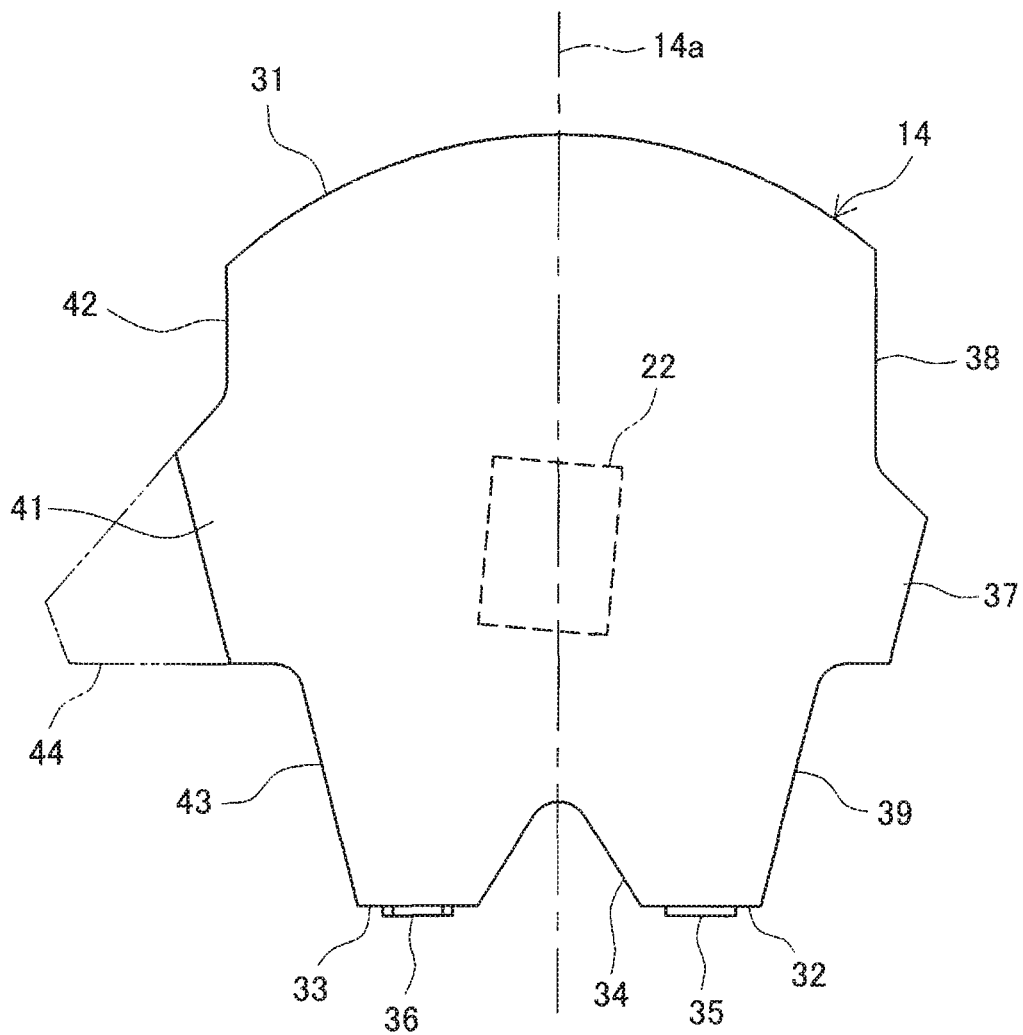
FIG. 6 is a cross-sectional view of the light guide body of FIG. 5.

As shown in FIG. 5, the light guide body 14 has a length corresponding to an original document read width of the reading carriage 4 in the longitudinal direction, and is formed in a uniform cross-section shape over the entire length, for example, using a transparent material such as glass, acrylic resin and epoxy resin having high translucency. The light guide body 14 has substantially an inverted trapezoidal shape shown in FIG. 6, where a light output surface 31 is provided on its top face, and first and second reflecting surfaces 32, 33 are provided on the bottom face opposed to the top face with a thin groove 34 therebetween. The light output surface 31 is processed in surface to a lens surface having a certain curvature, or comprised of a convex curved surface where the curvature changes stepwise or continuously in the circumferential direction. In addition, in FIG. 5, to indicate the entire light guide body 14 in the figure, in drawing, a part of the center portion of the light guide body 14 is omitted to draw.

The first and second reflecting surfaces 32, 33 are formed symmetrically with respect to a center axis 14a orthogonal to the bottom face in the center position in its width direction i.e. at an equal distance from the center axis 14a with the thin groove 34 therebetween in the same plane with the same width. In the first and second reflecting surfaces 32, 33 are formed first and second diffuse reflection patterns 35, 36 described later, respectively. Further, the luminous element 22 of each light source unit 21 is disposed to be positioned on the center axis 14a.

The side surface connecting between the light output surface 31 and the first reflecting surface 32 is comprised of a first upper side surface 38 continuing to the light output surface 31, and a first lower side surface 39 continuing to the first reflecting surface 32, with a first protruding portion 37 therebetween. Similarly, the side surface connecting between the light output surface 31 and the second reflecting surface 33 is comprised of a second upper side surface 42 continuing to the light output surface 31, and a second lower side surface 43 continuing to the second reflecting surface 33, with a second protruding portion 41 therebetween. The first and second protruding portions 37, 41 are formed over the entire length of the light guide body 14.

As shown in FIG. 2, when the light guide body 14 is stored in the groove portion 16 of the carriage section 11, by engaging the fix member 17 in the first protruding portion 37 exposed to the upper side, it is possible to hold the light guide body 14 in the predetermined position and direction with more reliability. Further, in the second protruding portion 41, a protrusion 44 to position the light guide body 14 in the carriage section 11 is formed in a predetermined position in the longitudinal direction.

In this Embodiment, the first and second lower side surfaces 39, 43 are formed to extend outward respectively from the first and second reflecting surfaces 32, 33 with respect to the center axis 14a. In contrast thereto, the first and second upper side surfaces 38, 42 are formed approximately in parallel with the center axis 14a. By this means, it is possible to inwardly narrow a range in which light subjected to total reflection by the first and second upper side surfaces 38, 42 inside the translucent body 14 is output from the light output surface 31 to the outside i.e. to prevent the light from diffusing outward excessively.

Figure 7:
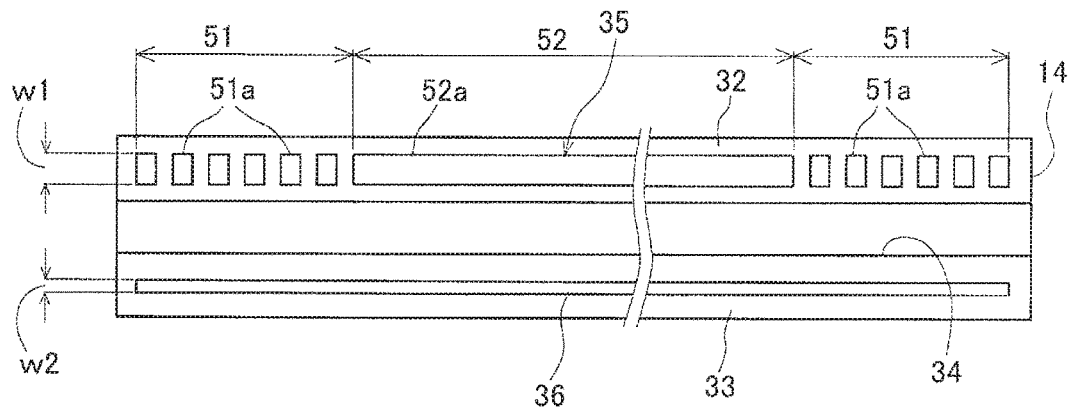
FIG. 7 is a bottom view illustrating first and second diffuse reflection patterns of the light guide body of FIG. 5.

FIG. 7 illustrates the first and second diffuse reflection patterns 35, 36 formed respectively in the first and second reflecting surfaces 32, 33. The first and second diffuse reflection patterns 35, 36 are formed by applying a reflecting coating such as white ink with high reflectance to the first and second reflecting surfaces 32, 33 by silk printing or the like, respectively. The light input to the first and second diffuse reflection patterns 35, 36 inside the light guide body 14 undergoes diffuse reflection i.e. is reflected at an angle different from the angle of incidence. As described above, since the first and second reflecting surfaces 32, 33 are in the same plane, it is possible to perform silk printing of the first and second diffuse reflection patterns 35, 36 in one process using a single common block. In another Embodiment, by performing etching processing or mold forming processing on the reflecting surface, it is possible to similarly form a concavo-convex surface for causing diffuse reflection.

In FIG. 7, the first diffuse reflection pattern 35 is comprised of discontinuous pattern portions 51 in which a plurality of short rectangular patterns 51a is formed intermittently along the longitudinal direction in a range with a predetermined length from each of opposite end portions of the light guide body 14, and a continuous pattern portion 52 comprised of a single long rectangular pattern 52a disposed between the portions 51. The short rectangular patterns 51a have the same dimensions and shape as one another, and are disposed linearly at certain intervals. The long rectangular pattern 52a has the same certain width as the short rectangular pattern 51a over the entire length, and is disposed in the same line as the discontinuous pattern portion 51. In contrast thereto, the second diffuse reflection pattern 36 is formed of a single long rectangular pattern continuous with a certain width over the entire length in the longitudinal direction. In other words, the second diffuse reflection pattern 36 is provided to at least partially compensate for intervals i.e. discontinuous portions of the rectangular patterns 51a of the discontinuous pattern portion 51.

The light emitted from the luminous element 22 of each light source unit 21 is input to the inside of the light guide body 14 from respective one of the opposite end faces of the body, and propagates in the longitudinal direction, while repeating total reflection by the inner surface of the light guide body 14. Inside the light guide body 14, the light input to the first and second reflection surfaces 32, 33 undergoes diffuse reflection in portions where the first and second diffuse reflection patterns 35, 36 are formed, while undergoing total reflection in portions where the first and second diffuse reflection patterns 35, 36 are not formed. When the angle of incidence upon the light output surface is a predetermined critical angle or more, the light reflected toward the light output surface 31 from the first and second diffuse reflection patterns 35, 36 undergoes total reflection by the light output surface 31 to return inside the light guide body 14, and when the angle is smaller than the predetermined critical angle, is output to the outside via the light output surface 31. By this means, linear light is output from the light output surface 31 over approximately the entire length of the light guide body 14.

In the case of forming the pattern by silk printing (or another method), generally, irrespective of whether dimensions of the pattern are large or small, tolerance in manufacturing is the same, and therefore, the effect of tolerance is exhibited larger as the dimensions are smaller, while being exhibited smaller as the dimensions are larger. In this Embodiment, the width w1 of the first diffuse reflection pattern 35 is set to be larger than the width w2 of the second diffuse reflection pattern 36. Accordingly, in the longitudinal direction of the light guide body 14 i.e. the main scanning direction, in the intensity distribution of light which is reflected by the first diffuse reflection pattern 35 and is output from the light guide body 14, the effect of tolerance is reduced, and accordingly, variations in the illuminance distribution are decreased in the original document read surface.

The intensity distribution of output light by the first diffuse reflection pattern 35 is not certain as the whole along the longitudinal direction of the light guide body 14. In a range that corresponds to the continuous pattern portion 52, the intensity distribution of output light is approximately certain. In contrast thereto, in a range that corresponds to the discontinuous pattern portion 51, since a light quantity of output light decreases in the discontinuous portion of the short rectangular pattern 51a along the longitudinal direction, the intensity distribution of output light varies in the shape of a wave corresponding to the decrease.

The variation in the shape of a wave causes a ripple in the light quantity, in viewing the output light in the same height position spaced a predetermined distance away from the light guide body along the longitudinal direction of the light guide body 14. Herein, the ripple in the light quantity refers to variations in density i.e. light quantity due to a difference in the distribution of light illuminance. When an original document is irradiated with light with a difference in the light intensity distribution along the main scanning direction and the reflected light is read continuously in the sub-canning direction by a line sensor such as a CCD with uniform sensitivity characteristics, an image formed by the data generates a stripe pattern along the main scanning direction. The second diffuse reflection pattern 36 is provided so that the intensity distribution of the output light resolves, or relieves and decreases variations in the intensity distribution of the output light by the first diffuse reflection pattern 35.

Figure 8:
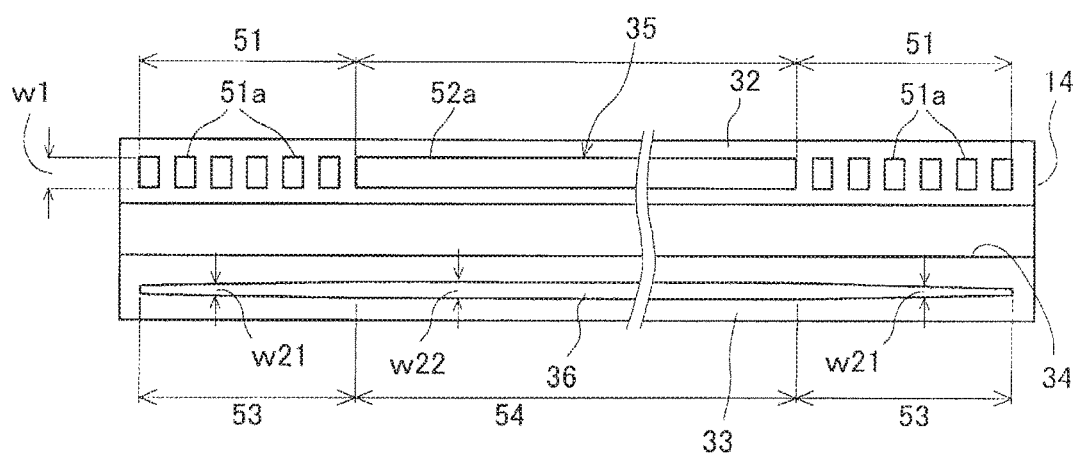
FIG. 8 is a bottom view illustrating a Modification of the first and second diffuse reflection patterns as in FIG. 7.

FIG. 8 illustrates another Embodiment of the first and second diffuse reflection patterns 35, 36 formed on the first and second reflecting surfaces 32, 33. This Embodiment differs from the Embodiment in FIG. 7, in the respect that the second diffuse reflection pattern 36 continuous in the longitudinal direction is comprised of width varying pattern portions 53 on the opposite ends and a constant width pattern portion 54 at the center. The width varying pattern portion 53 is provided in the same range as the discontinuous pattern portion 51 of the first diffuse reflection pattern 35 in the longitudinal direction, and is formed so that a width w21 gradually decreases toward the end portion of the light guide body 14. The constant width pattern portion 54 has a width w22 the same or smaller as/than that of the first diffuse reflection pattern 35 over the entire length.

Further, in another Embodiment, as in the discontinuous pattern portion 51 of the first diffuse reflection pattern 35, it is possible to form the width varying pattern portion 53 of FIG. 8, using a plurality of short rectangular patterns disposed intermittently along the longitudinal direction. In this case, the short rectangular patterns are disposed to at least partially compensate for intervals i.e. discontinuous portions of the rectangular patterns 51a of the discontinuous pattern portion 51.

The first diffuse reflection pattern 35 is also not limited to the configuration of FIG. 7 as described above. For example, it is possible to set the pattern so that the dimension in the longitudinal direction of the short rectangular pattern 51a is longer from the end portion to the center portion of the light guide body 14 and/or the interval of the rectangular pattern 51a is shorter. Further, it is also possible to suitably set or vary the set range of the discontinuous pattern portion 51 in the longitudinal direction of the light guide body 14, corresponding to design conditions of the image reading apparatus 1 and reading carriage 4, original document read width, optical characteristics of the reading section 5 and the like.

Figure 9:
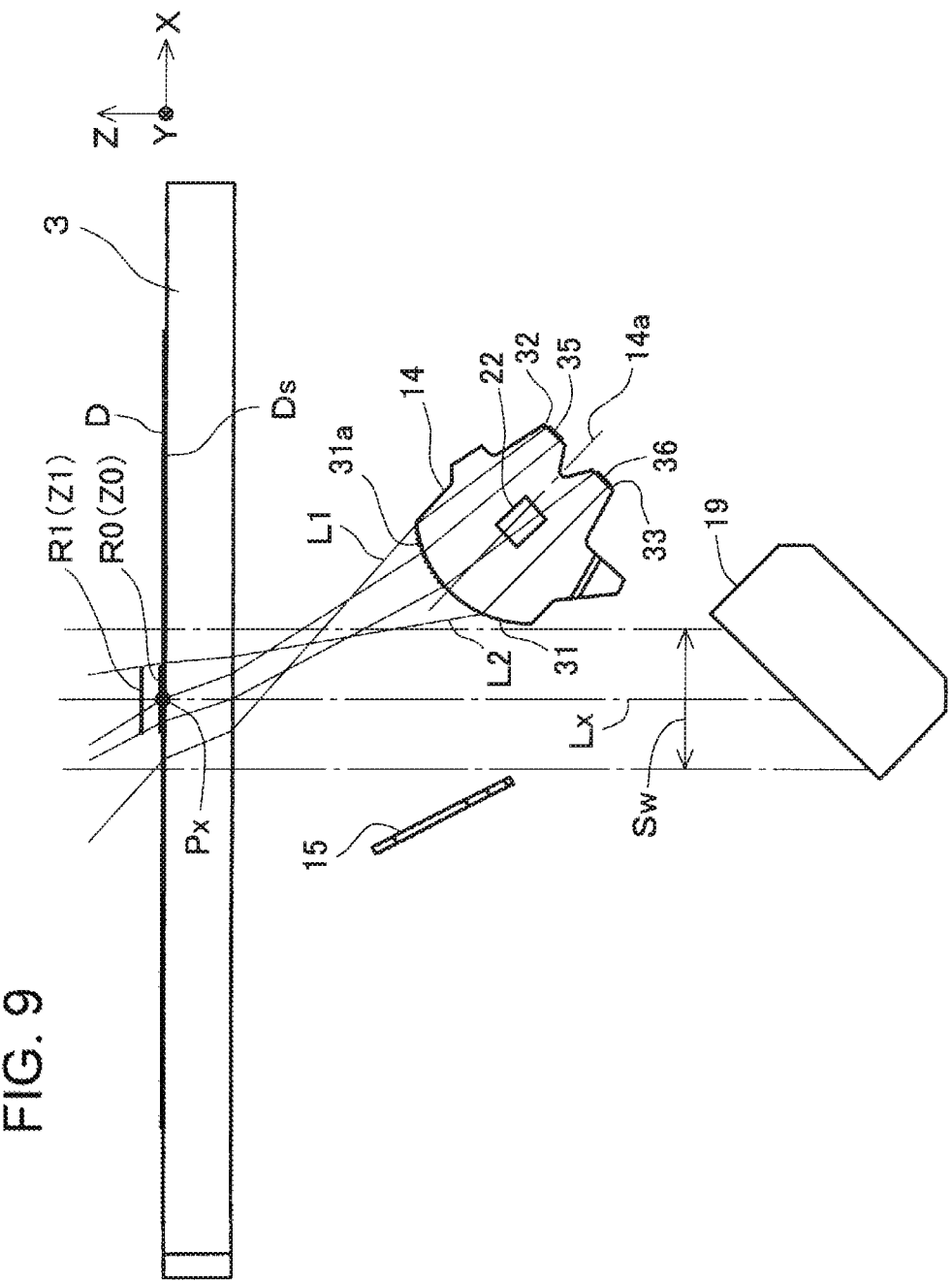
FIG. 9 is a schematic view to explain orientation of illumination light in the lighting apparatus of FIG. 2.

FIG. 9 illustrates arrangements of the lighting optical system and reflection optical system of the lighting apparatus 12 in the reading carriage 4 and orientation of illumination light to irradiate an original document on the platen glass 3. In FIG. 9, a reference numeral Lx denotes a read optical axis of reflected light that is reflected vertically toward the first reflecting mirror 19 from the read surface Ds of the original document D on the platen glass 3. An intersection point of the read optical axis Lx and the top face of the platen glass 3 is a read position Px of the original document in the sub-scanning direction X. Further, in FIG. 9, R0 represents a lighting region targeted in the sub-scanning direction in a height position Z0 of the top face of the platen glass 3, and R1 represents a lighting region targeted in the sub-scanning direction in some height position Z1 from the top face of the platen glass 3.

The light guide body 14 and reflector 15 of the lighting optical system are disposed so that the light output surface 31 and reflecting surface 15a are faced toward the original document read position Px, and that the read optical axis Lx passes through the intermediate position thereof. At this point, a clearance defined between the light guide body 14 and the reflector 15 along the main scanning direction Y is a read opening width Sw of reflected light reflected from the original document read surface Ds.

The light guide body 14 is disposed with the center axis 14a inclined, so that the first reflecting surface 32 is positioned on the side farther from the read optical axis Lx and closer to the platen glass 3 than the second reflecting surface 33. By this means, in output light L1 from the first diffuse reflection pattern 35, the angle of incidence upon the original document read surface Ds is smaller than that of output light L2 from the second diffuse reflection pattern 36. In other words, in the output light L1 from the first diffuse reflection pattern 35, an irradiation range of the original document read surface Ds is wider in the sub-scanning direction than that of the output light L2 from the second diffuse reflection pattern 36. As a result, it is possible to compensate for variations in the intensity distribution in the main scanning direction of the output light by the discontinuous pattern portion 51 of the first diffuse reflection pattern 35, using the output light from the first diffuse reflection pattern 35, and to reduce or relieve more effectively. Further, in another Embodiment, a portion 31a, from which the light from the first diffuse reflection pattern 35 is output, of the light output surface 31 is processed to be a rough surface to diffuse the output light L1, and it is thereby possible to also suppress variations in the intensity distribution in the main scanning direction.

Further, the light guide body 14 is disposed, while being inclined relatively largely, so that the center axis 14a crosses the read optical axis Lx in a position below the platen glass 3. By this means, in the output light L2 from the second diffuse reflection pattern 36, the angle of incidence upon the read optical axis Lx above the platen glass 3 is smaller than that of the output light L1 from the first diffuse reflection pattern 35. In other words, in the output light L2 from the second diffuse reflection pattern 36, a lighting range of the original document read surface Ds is wider than that of the output light L1 from the first diffuse reflection pattern 35, above the platen glass 3. As a result, in the range wider than the conventional range above the original document read position Px of the platen glass 3, it is possible to suppress decrease in the light intensity, and to enlarge a range capable of obtaining a sharp image in the height direction Z with respect to rising of the original document.

Figure 10:
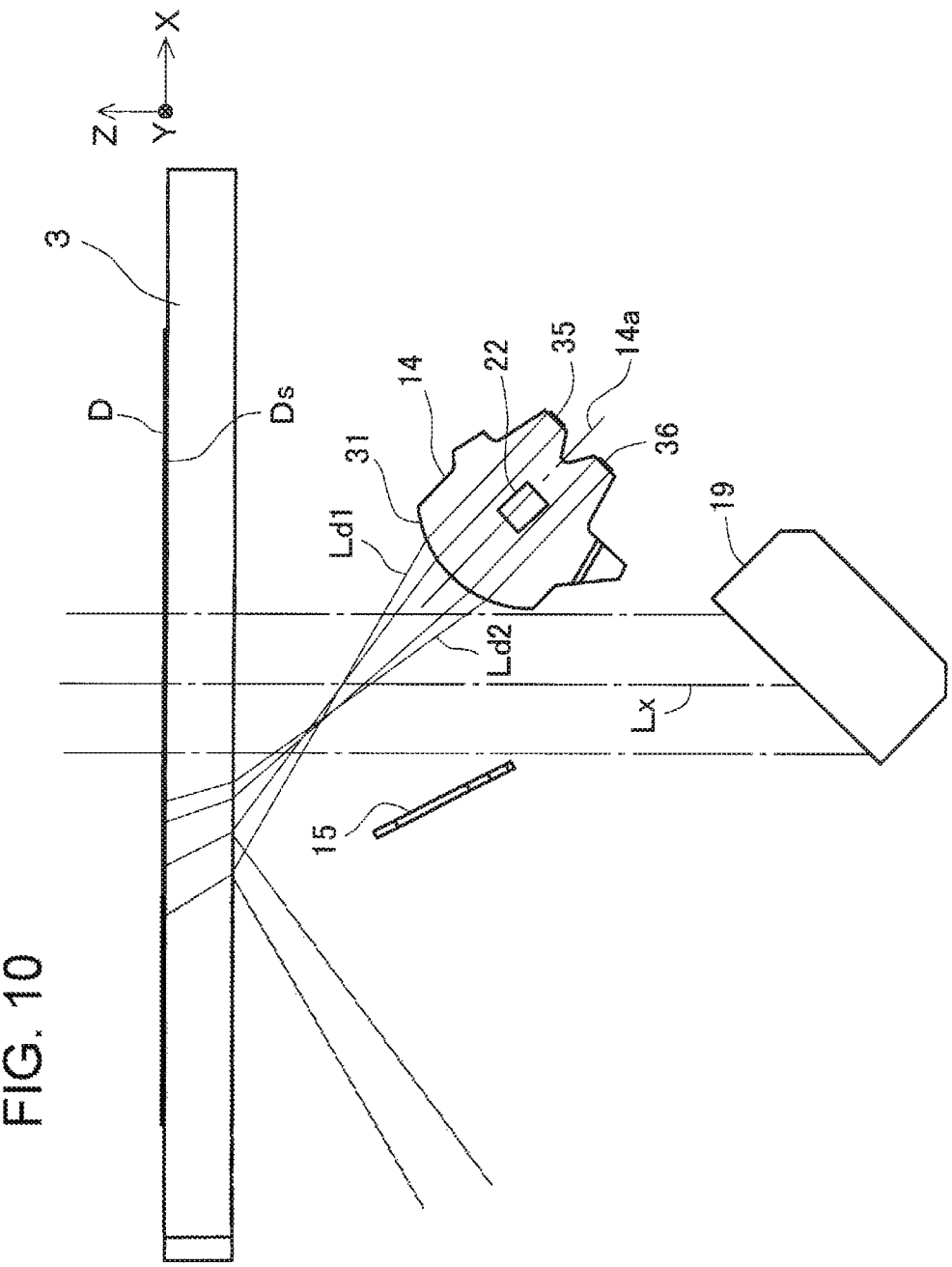
FIG. 10 is a schematic view to explain orientation of the light guide body.

Furthermore, as shown in FIG. 10, the light guide body 14 is disposed so that output light Ld1 vertically reflected from the first diffuse reflection pattern 35 and output light Ld2 vertically reflected from the second diffuse reflection pattern 36 cross the read optical axis Lx below the platen glass 3. By this means, it is possible to more enlarge the lighting range of the original document read surface Ds in the sub-scanning direction X. As a result, it is possible to more increase the intensity of reflected light in the read opening width Sw, and make the intensity distribution more uniform. Accordingly, also in the sub-scanning direction, it is possible to enhance uniformity of the illuminance distribution in an effective read range of reflected light.

Figure 11:
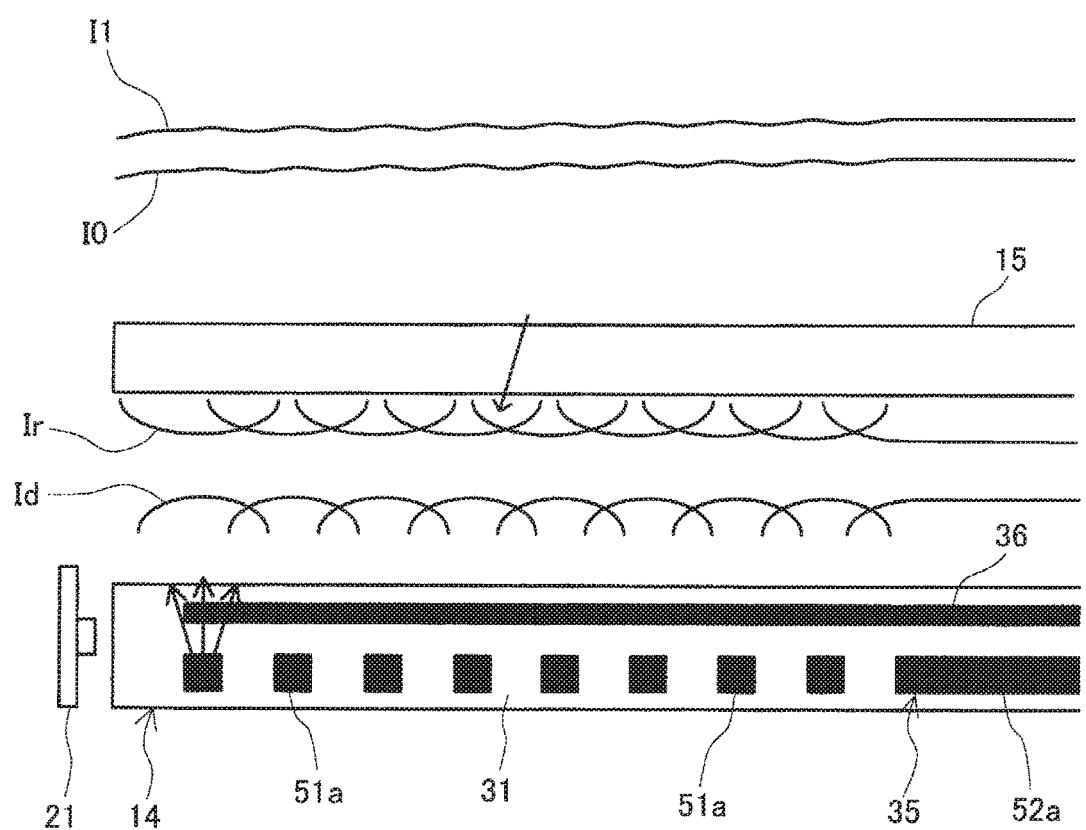
FIG. 11 is an explanatory view of illuminance distribution in a longitudinal direction by direct light of the light guide body and reflected light from a reflector.

FIG. 11 illustrates the illuminance distribution along the longitudinal direction of the light guide body 14 i.e. main scanning direction, due to lighting of the original document surface by direct light of the light guide body 14 and lighting of the original document surface by reflected light from the reflector 15, in the lighting apparatus 12 of this Embodiment. In FIG. 11, Id represents the intensity distribution of illumination light by the light directly output from the light guide body 14, and Ir represents the intensity distribution of illumination light by the light which is output from the light guide body 14 and is reflected by the reflector 15. I0 represents the intensity distribution of illumination light at the height Z0 of the top face of the platen glass 3 by both the direct light of the light guide body 14 and the reflected light from the reflector 15, and I1 represents the intensity distribution of illumination light at some height Z1 from the top face of the platen glass 3. As shown in FIG. 11, in both of the light intensity distributions Id and Ir, the effect of the discontinuous pattern portion 51 of the first diffuse reflection pattern 35 is reduced, and the reduction is more remarkable particularly in the light intensity distributions I0 and I1.

Generally, the emitted light in a natural state diffuses, while spreading radially, and as the distance from the emission point increases, the diffusion range is enlarged. In this Embodiment, the light intensity distribution of the light output from the discontinuous pattern portion 51 of the first diffuse reflection pattern 35 varies along the longitudinal direction, due to overlapping of light diffused from respective rectangular patterns 51a. The variation in the light intensity distribution appears as the so-called ripple in the light intensity i.e. variation in the light intensity, in the original document read surface on the platen glass 3. In the variation in the light intensity due to diffused light from the discontinuous pattern portion 51, the period and amplitude varies corresponding to the optical path length. In the light which is applied from the light guide body 14 and is reflected by the reflector 15 to irradiate the original document read surface, the optical path is longer than the light directly applied from the light guide body 14, and the variation in the light intensity is large in the period and is small in the amplitude.

In this Embodiment, the light of two optical systems thus different in the variation period and amplitude of the light intensity crosses each other in the original document read surface, and the ripple is thereby reduced in the light intensity due to the direct light of the light guide body 14. Further, in this Embodiment, in addition thereto, the output light from the second diffuse reflection pattern 36 is applied to the original document read surface directly and via the reflector 15, and therefore, the ripple in the light intensity due to the direct light from the first diffuse reflection pattern 35 is further reduced more.

Figure 12:
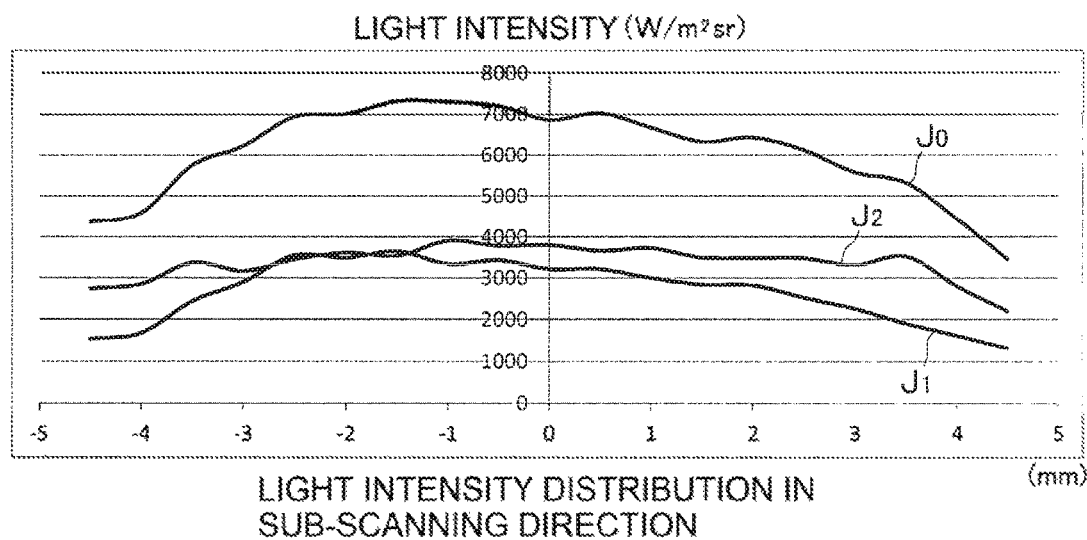
FIG. 12 is a graph showing light intensity distributions in a sub-scanning direction by direct light of the light guide body and reflected light from the reflector.

FIG. 12 illustrates the illuminance distribution along the sub-scanning direction of the light guide body 14, due to lighting of the original document surface by the direct light of the light guide body 14 and lighting of the original document surface by the reflected light from the reflector 15. In FIG. 12, J1 represents the intensity distribution of illumination light from the first diffuse reflection pattern 35 of the light guide body 14, and J2 represents the intensity distribution of illumination light from the second diffuse reflection pattern 36. J0 represents the intensity distribution of illumination light at the height Z0 of the top face of the platen glass 3 by both the first diffuse reflection pattern 35 and the second diffuse reflection pattern 36. Further, the distance from the original document read position Px in the sub-scanning direction X is positive on the light guide body 14 side. As shown in FIG. 12, it is understood that high uniformity is exerted in a range in which the intensity of illumination light is high and the intensity distribution is relatively wide in the sub-scanning direction.

Figure 13:
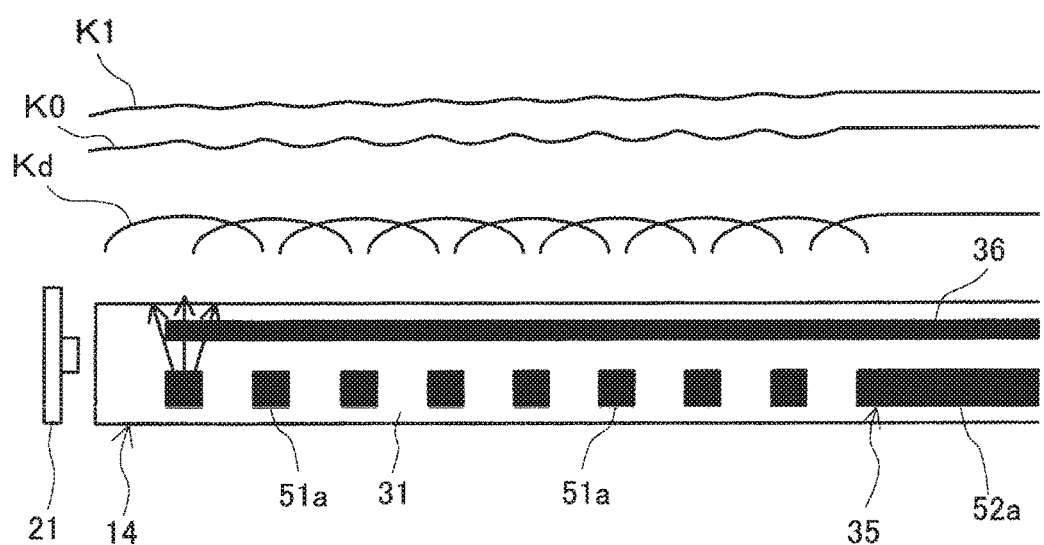
FIG. 13 is an explanatory view of illuminance distribution in the longitudinal direction (main scanning direction) by direct light of the light guide body.

According to another Embodiment of the present invention, in the lighting apparatus 12, it is possible to omit the reflector 15, and to apply light to the original document read surface only by the light guide body 14. FIG. 13 illustrates the illuminance distribution along the longitudinal direction i.e. the main scanning direction by only the direct light of the light guide body 14. In FIG. 13, Kd represents the intensity distribution of illumination light in the light output surface 31 of the light guide body 14, K0 represents the intensity distribution of illumination light at the height Z0 of the top face of the platen glass 3, and K1 represents the intensity distribution of illumination light at some height Z1 from the top face of the platen glass 3.

Figure 14:
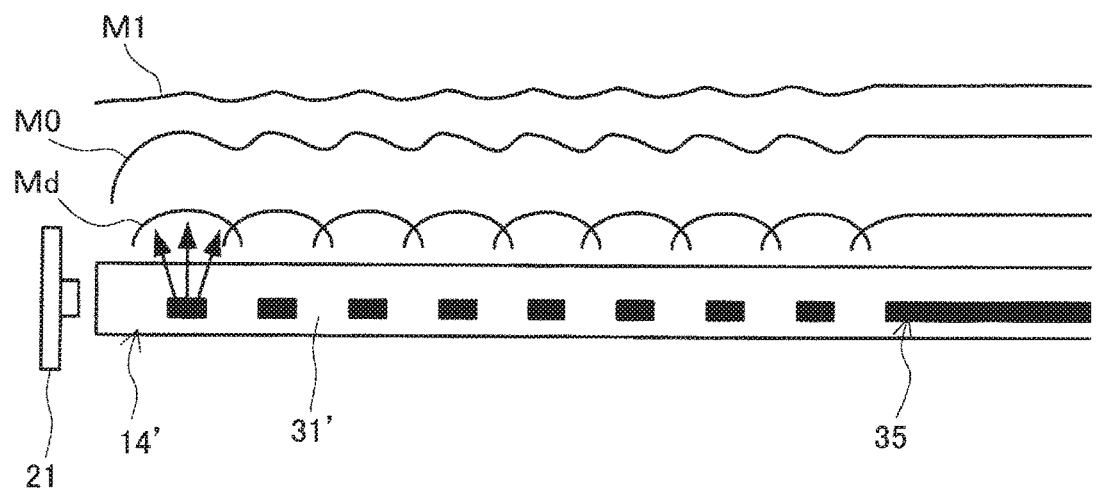
FIG. 14 is an explanatory view of illuminance distribution as in FIG. 13 in a Comparative Example.

In contrast thereto, FIG. 14 illustrates the illuminance distribution along the longitudinal direction in a light guide body of a Comparative Example where only the first diffuse reflection pattern 35 is formed on the reflecting surface. In FIG. 14, Md represents the intensity distribution of illumination light in the light output surface 31 of the light guide body 14, M0 represents the intensity distribution of illumination light at the height Z0 of the top face of the platen glass 3, and M1 represents the intensity distribution of illumination light at some height Z1 from the top face of the platen glass 3. As can be seen by comparing FIG. 13 with FIG. 14, by combining the first diffuse reflection pattern 35 and the second diffuse reflection pattern 36, the effect of the discontinuous pattern portion 51 of the first diffuse reflection pattern 35 is effectively reduced.

Figure 15:
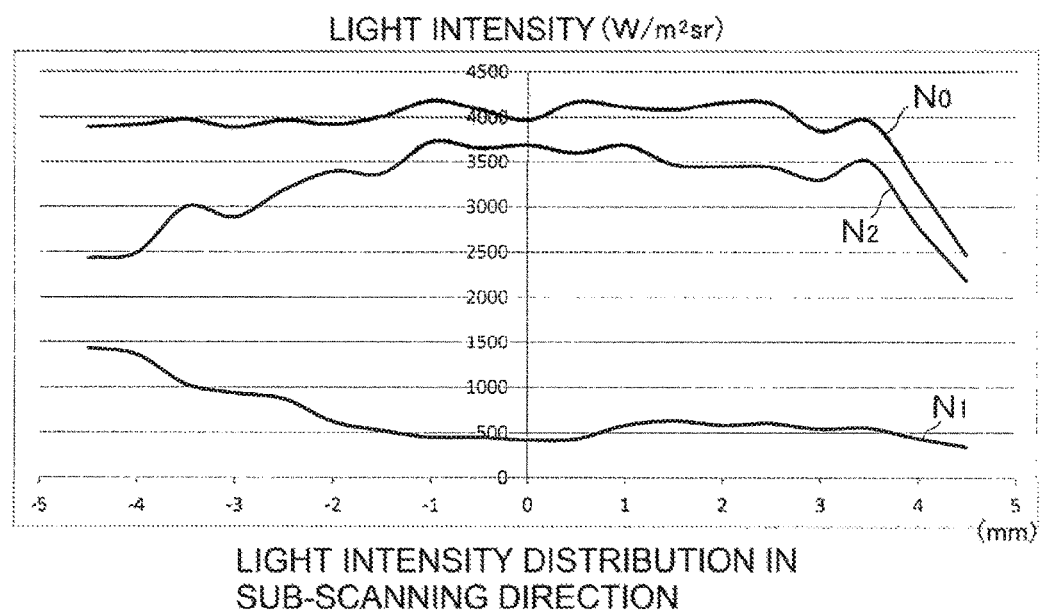
FIG. 15 is a graph showing light intensity distributions in the sub-scanning direction by direct light of the light guide body.

FIG. 15 shows simulation results of the illuminance distribution along the sub-scanning direction of the light guide body 14, due to lighting of the original document surface by direct light of the light guide body 14. In FIG. 15, N1 represents the intensity distribution of illumination light from the first diffuse reflection pattern 35 of the light guide body 14, and N2 represents the intensity distribution of illumination light from the second diffuse reflection pattern 36. N0 represents the intensity distribution of illumination light at the top face of the platen glass 3 by both the first diffuse reflection pattern 35 and the second diffuse reflection pattern 36. From FIG. 15, also in the lighting apparatus with the reflector 15 omitted, it is possible to obtain high uniformity of the intensity distribution in a relatively wide range where the intensity of illumination light is high in the sub-scanning direction.

AS described above, the present invention is explained in association with the preferred Embodiments, and it is indisputable that the invention is not limited to above-mentioned Embodiments, and is capable of being carried into practice with various changes or modifications thereof in its technical scope. For example, it is possible to arrange the light source unit 21 only in one end portion of the light guide body 14, and form a reflecting surface for reflecting light propagating inside the light guide body 14 toward the one end portion in the other end portion.

In addition, this application claims priority from Japanese Patent Application No. 2016-167609 and Japanese Patent Application No. 2016-167610, incorporated herein by reference.

What is claimed is:

1. A lighting apparatus comprising:
a rod-shaped light guide body formed of a translucent material; and
a light source adapted to input light to the light guide body from at least one end face in a longitudinal direction of the body,
wherein the light guide body includes a plurality of reflecting surfaces that reflect the light input to the light guide body from the light source, and a light output surface that outputs the light from the light guide body to the outside,
at least one of the reflecting surfaces includes a first diffuse reflection pattern for performing diffuse reflection on the light including a discontinuous pattern formed intermittently at predetermined intervals along the longitudinal direction, and
at least another of the reflecting surfaces includes a second diffuse reflection pattern which is different from the first diffuse reflection pattern and a continuous pattern for performing diffuse reflection on the light provided to correspond to the predetermined intervals of the discontinuous pattern along the longitudinal direction.

2. The lighting apparatus according to claim 1, wherein the first diffuse reflection pattern includes the discontinuous pattern formed intermittently at the predetermined intervals along the longitudinal direction, and a continuous pattern, and
the second diffuse reflection pattern includes a continuous pattern at a position corresponding to the discontinuous pattern.

3. The lighting apparatus according to claim 2, further comprising:
a reflecting member adapted to reflect the light that is reflected from the first diffuse reflection pattern and that is output from the light output surface.

4. The lighting apparatus according to claim 3, wherein the reflecting member is disposed on a side to which the at least another of the reflecting surfaces is closer than the at least one of reflecting surfaces with respect to the light guide body.

5. The lighting apparatus according to claim 2, wherein a width in a direction orthogonal to the longitudinal direction of the first diffuse reflection pattern is wider than a width in the direction orthogonal to the longitudinal direction of the second diffuse reflection pattern.

6. The lighting apparatus according to claim 2, wherein the at least one of reflecting surfaces and the at least another of the reflecting surfaces are provided in the same plane.

7. An image reading apparatus comprising:
the lighting apparatus according to claim 2; and
a photoelectric conversion section adapted to perform photoelectric conversion on light that is output from the lighting apparatus and that is reflected by a read surface of an original document.

8. The image reading apparatus according to claim 7, wherein in the light guide body of the lighting apparatus, the at least one of reflecting surfaces is disposed to be positioned on a side farther from a read optical axis of the light reflected by the read surface of the original document than the at least another of the reflecting surfaces.

9. The image reading apparatus according to claim 7, wherein the light guide body of the lighting apparatus is disposed, so that light that is reflected vertically from the at least one of reflecting surfaces and the at least another of the reflecting surfaces and that is output from the light output surface crosses the read optical axis of the light reflected by the read surface of the original document.

10. The lighting apparatus according to claim 1, wherein the plurality of reflecting surfaces include a first reflecting surface having a total reflection, on which the first diffuse reflection pattern is formed, a second reflecting surface having a total reflection, on which the second reflection pattern is formed, and a groove between the first reflecting surface and the second reflecting surface.

11. The lighting apparatus according to claim 1, wherein the first diffuse refection pattern includes two end portions each having a plurality of discontinuous portions, and an elongated center portion between the two end portions, and the second diffuse reflection pattern includes one elongated portion arranged parallel to the first diffuse reflection pattern.

12. A lighting apparatus comprising:
a rod-shaped light guide body formed of a translucent material; and
a light source adapted to input light to the light guide body from at least one end face in a longitudinal direction of the body,
wherein the light guide body includes a plurality of reflecting surfaces that reflect the light input to the light guide body from the light source, and a light output surface that outputs the light from the light guide body to the outside,
at least one of the reflecting surfaces includes a first diffuse reflection pattern for performing diffuse reflection on the light including a discontinuous pattern formed intermittently at predetermined intervals along the longitudinal direction, and
at least another of the reflecting surfaces includes a second diffuse reflection pattern which is different from the first diffuse reflection pattern and a continuous pattern for performing diffuse reflection on the light provided to reduce a variation in the longitudinal direction of a quantity of the light that is reflected from the first diffuse reflection pattern and that is output from the light output surface.

13. The lighting apparatus according to claim 12, wherein the first diffuse reflection pattern includes the discontinuous pattern formed intermittently at the predetermined intervals along the longitudinal direction, and a continuous pattern, and the second diffuse reflection pattern includes a continuous pattern at a position corresponding to the discontinuous pattern.

14. The lighting apparatus according to claim 13, further comprising:

a reflecting member adapted to reflect the light that is reflected from the first diffuse reflection pattern and that is output from the light output surface.

15. The lighting apparatus according to claim 14, wherein the reflecting member is disposed on a side to which the at least another of the reflecting surfaces is closer than the at least one of reflecting surfaces with respect to the light guide body.

16. The lighting apparatus according to claim 13, wherein a width in a direction orthogonal to the longitudinal direction of the first diffuse reflection pattern is wider than a width in the direction orthogonal to the longitudinal direction of the second diffuse reflection pattern.

17. The lighting apparatus according to claim 13, wherein the at least one of reflecting surfaces and the at least another of the reflecting surfaces are provided in the same plane.

18. An image reading apparatus comprising:

the lighting apparatus according to claim 13; and a photoelectric conversion section adapted to perform photoelectric conversion on light that is output from the lighting apparatus and that is reflected by a read surface of an original document.

19. The image reading apparatus according to claim 18, wherein in the light guide body of the lighting apparatus, the at least one of reflecting surfaces is disposed to be positioned on a side farther from a read optical axis of the light reflected by the read surface of the original document than the at least another of the reflecting surfaces.

20. The image reading apparatus according to claim 18, wherein the light guide body of the lighting apparatus is disposed, so that light that is reflected vertically from the at least one of reflecting surfaces and the at least another of the reflecting surfaces and that is output from the light output surface crosses the read optical axis of the light reflected by the read surface of the original document.

\* \* \* \* \*